United States Patent [19]

Kuriyama

[11] Patent Number: 4,618,902
[45] Date of Patent: Oct. 21, 1986

[54] MAGNETIC HEAD WITH CLAMPING ERASE BACK CORE

[75] Inventor: Toshihiro Kuriyama, Koidemachi, Japan

[73] Assignee: Alps Electric Co., Ltd., Japan

[21] Appl. No.: 509,720

[22] Filed: Jun. 30, 1983

[30] Foreign Application Priority Data

Jul. 1, 1982 [JP] Japan ................................. 57-114669

[51] Int. Cl.⁴ .............................................. G11B 5/27
[52] U.S. Cl. .................................... 360/118; 360/66; 360/121
[58] Field of Search .......... 360/118, 121, 66, 125–127, 360/128–129

[56] References Cited

U.S. PATENT DOCUMENTS

| | | | |
|---|---|---|---|
| 3,412,216 | 11/1968 | Rosado et al. | 360/127 |
| 4,110,804 | 8/1978 | Castrodale et al. | 360/118 |
| 4,152,742 | 5/1979 | Kronfeld | 360/125 |
| 4,276,574 | 6/1981 | Baasch et al. | 360/118 |

*Primary Examiner*—John H. Wolff
*Assistant Examiner*—David J. Severin
*Attorney, Agent, or Firm*—Guy W. Shoup

[57] ABSTRACT

In a magnetic head having a write/read layer for writing and reading data, erase layers for erasing edge portions of recording newly written in a writing operation and recording previously written, and an erase-back core, the improvement wherein the erase-back core is made of metal magnetic material and has side clamping pieces for clamping the core on both sides of the erase layers.

2 Claims, 3 Drawing Figures

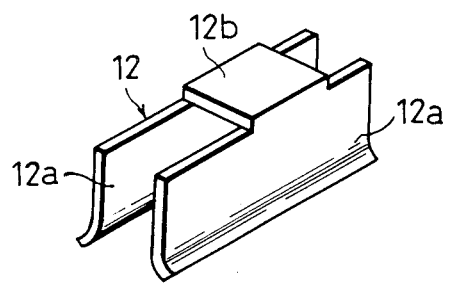
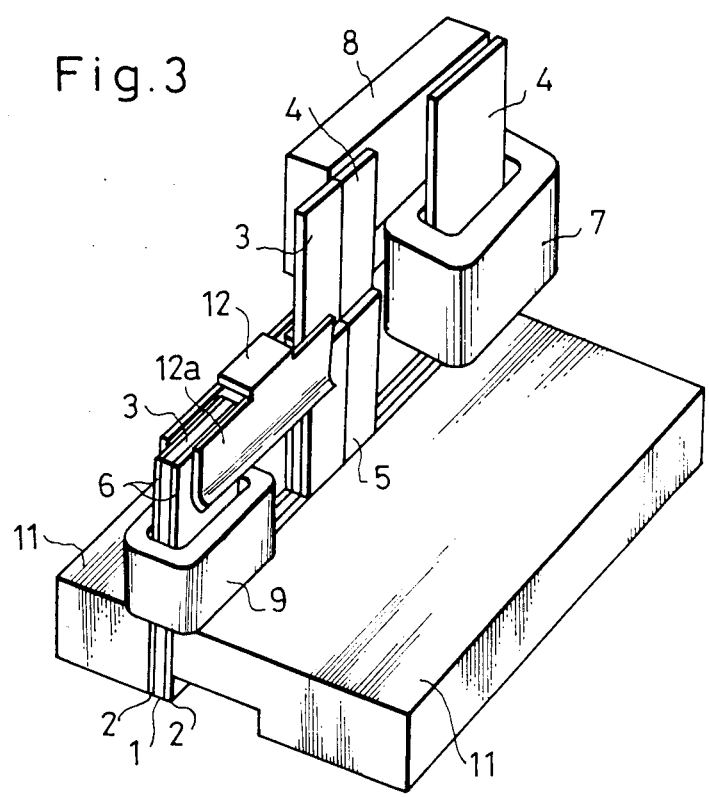

MAGNETIC HEAD WITH CLAMPING ERASE BACK CORE

BACKGROUND OF THE INVENTION

The present invention relates to a magnetic head, and more particularly to an improved magnetic head for use in flexible magnetic disk devices.

In general, in magnetic disk devices, especially flexible magnetic disk devices, there has been extensively employed a magnetic head of layered structure which includes a write/read layer for writing and reading data and which is provided on both the sides of the write/read layer with erase layers for erasing the edge portions of newly written data in a writing operation and previously written data. There has also been an erase structure of the tunnel type in which the gaps of the erase layers are shifted and arranged backward in the traveling direction of a disk medium with respect to the gap of the write/read layer.

In such erasing magnetic head of the tunnel type, it is desirable that magnetic core portions forming the erasing magnetic flux paths in the two erase layers on both the sides of the write/read layer be put into completely closed forms so as to suppress the leakage of erasing magnetic fluxes into the write/read layer, thereby to enhance the efficiencies of the erase layers. Especially in the presence of leakage of the erasing magnetic flux into the write/read layer in the writing operation, there have been serious problems concerning the performance of the magnetic head, such as the occurrence of an erasing bias action which distorts a signal waveform.

A prior-art magnetic head therefore comprises a write/read layer 1 consisting of a nonmagnetic material 3 and a magnetic material 4, and erase layers 2 consisting of a nonmagnetic material 5 and a magnetic material 6, as shown in FIG. 1. Nonmagnetic sliders 11 are bonded on both the sides of the erase layers 2. A write/read coil 7 is wound round the magnetic material 4, and a write/read-back core 8 is mounted thereon. Further, an erase coil 9 and erase-back cores 10 are mounted on the magnetic material 6, 6. By installing the erase-back cores 10, the erasing magnetic flux paths are closed to prevent the aforementioned leakage of the erasing magnetic fluxes.

Since, however, such erase-back core 10 in the prior art is a flat plate and does not have a holding portion, it needs to be pressed (tentatively fixed) with a jig or by hand during installation, and the assemblage takes a long time. Besides, the installation of the erase-back core 10 sometimes incurs the trouble that a part of the erase layer or the write/read layer is damaged. Further, since a resin for the tentative fixation is liable to enter the joint plane between the erase-back core 10 and the magnetic material 6, the characteristics of the core are apt to disperse. In addition, an oxide magnetic material such as ferrite is used as the material of the erase-back core 10. When fabricating the erase-back core 10 out of ferrite, this material needs to be mirror-finished to prevent a backward gap being formed in the joint plane between the magnetic material 6 and the erase-back core 10. This also leads to the problem that the erase-back core becomes costly.

SUMMARY OF THE INVENTION

The present invention has for its object to eliminate the problems of the prior art as thus far described.

According to the present invention, the material for an erase-back core is a metal magnetic material such as permalloy, and the erase-back core itself is endowed with a self-holding function for installation.

BRIEF DESCRIPTION OF THE DRAWINGS

FIG. 2 is a perspective view showing an erase-back core according to the present invention; and FIG. 3 is a perspective view of essential portions showing the structure of a magnetic head according to the present invention.

PREFERRED EMBODIMENT OF THE INVENTION

Figure 1:
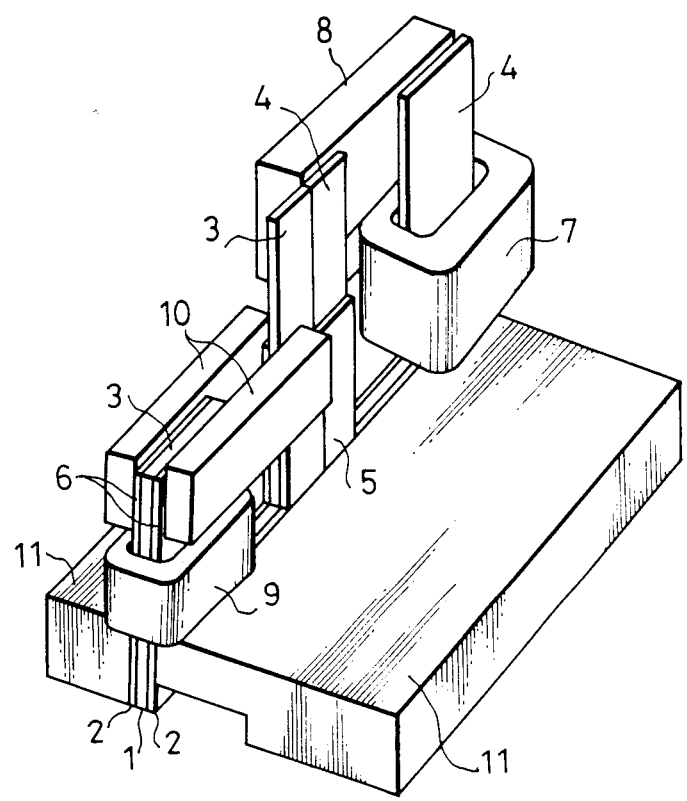
FIG. 1 is a perspective view of essential portions showing the structure of a prior-art magnetic head.

An embodiment of the present invention will now be described with reference to the drawings. The setup of a write/read layer 1 as well as an erase layer 2 are the same as in the prior-art example (refer to FIG. 1). In the present invention, as shown in FIG. 2, an erase-back core 12 is made of a metal magnetic material such as permalloy and is about 0.1 mm thick. The erase-back core 12 consists of clamping pieces 12a, 12a and a coupling portion 12b, so that the metal magnetic structure has springiness in itself. As seen from FIG. 3, when the erase-back core 12 is fitted on so as to hold the magnetic material members 6, 6 of both the erase layers 2 between the clamping pieces 12a, 12a, it exhibits a self-holding function owing to the springiness of its own.

Owing to such construction, the installation of the erase-back core 12 is very easy. Besides, the tentative fixation with a resin or the like is dispensed with, and the drawbacks involved in the assemblage of the prior-art structure are avoided. In addition, since the material of the erase-back core 12 is the metal magnetic material such as permalloy, it can be punched by press work unlike the ferrite in the prior art, so that the cost lowers. Moreover, as compared with the erase-back core of ferrite, the metal magnetic material is excellent in such magnetic characteristics as saturation flux density and magnetic permeability. Accordingly, the effect of reducing a magnetic reluctance and suppressing the leakage of the erasing magnetic flux by closing the erasing magnetic flux path is more remarkable than in the prior-art example, and improvements in the performance of the magnetic head are realized.

As set forth above, the magnetic head of the present invention has an erase-back core made of a metal magnetic material formed with clamping pieces for holding the magnetic material members of the erase layers therebetween. This achieves the prominent effect that the magnetic head superior to the prior-art magnetic head in the assembling job efficiency, cost and functions can be provided.

What is claimed is:

1. A magnetic head comprising a write-read layer for writing and reading data on a magnetic medium, a pair of erase layers made of magnetic material arranged on both sides of the write/read layer, and an erase back core made of a metal magnetic material and being formed with side clamping pieces resiliently joined by a coupling portion uniformly formed therebetween for clamping on both sides of said pair of erase layers, whereby said erase back core is provided to complete the flux path of the erase layers and is mounted in a clamping manner on the erase layers during assembly.

2. A magnetic head according to claim 1, wherein said erase back core is made of permalloy.

* * * * *